US011121799B2

(12) United States Patent
Ahn et al.

(10) Patent No.: US 11,121,799 B2
(45) Date of Patent: Sep. 14, 2021

(54) METHOD FOR DETERMINING MODULATION AND CODING SCHEME IN WIRELESS COMMUNICATION SYSTEM, AND DEVICE THEREFOR

(71) Applicant: LG Electronics Inc., Seoul (KR)

(72) Inventors: Minki Ahn, Seoul (KR); Jiwon Kang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 16/483,711

(22) PCT Filed: Jul. 26, 2017

(86) PCT No.: PCT/KR2017/008062
§ 371 (c)(1),
(2) Date: Aug. 5, 2019

(87) PCT Pub. No.: WO2018/143527
PCT Pub. Date: Aug. 9, 2018

(65) Prior Publication Data
US 2020/0028609 A1      Jan. 23, 2020

Related U.S. Application Data

(60) Provisional application No. 62/454,803, filed on Feb. 5, 2017.

(51) Int. Cl.
*H04W 56/00* (2009.01)
*H04L 1/00* (2006.01)
(Continued)

(52) U.S. Cl.
CPC .......... *H04L 1/0005* (2013.01); *H04L 1/0026* (2013.01); *H04L 5/0051* (2013.01); *H04W 24/08* (2013.01); *H04W 72/046* (2013.01)

(58) Field of Classification Search
CPC ... H04L 1/0005; H04L 1/0026; H04L 5/0051; H04W 24/08; H04W 72/046
(Continued)

(56) References Cited

U.S. PATENT DOCUMENTS

| 8,675,794 B1 | 3/2014 | Perets et al. |
| 2013/0195053 A1* | 8/2013 | Jeon ...................... H04L 1/0026 370/329 |

(Continued)

FOREIGN PATENT DOCUMENTS

| CN | 102934381 | 2/2013 |
| CN | 104753631 | 7/2015 |

(Continued)

OTHER PUBLICATIONS

European Extended Search Report in European Appln. No. 17894811.3, dated Nov. 3, 2020, 9 pages.

(Continued)

*Primary Examiner* — Sai Ming Chan
(74) *Attorney, Agent, or Firm* — Fish & Richardson P.C.

(57) ABSTRACT

The present invention provides a method for determining a modulation and coding scheme (MCS) to be applied to data in a wireless communication system, and a device therefor. Specifically, the method may comprise the steps of: reporting, to a base station, channel state information including a first measurement value related to a channel state between a terminal and the base station; receiving at least one downlink reference signal from the base station; calculating a second measurement value related to the channel state by using the received at least one downlink reference signal; when the second measurement values is equal to or smaller than a preconfigured threshold value in comparison with the first measurement value, transmitting, to the base station, a specific uplink signal requesting a change of an MCS (Continued)

designated to downlink data; and receiving the downlink data, to which the changed MCS has been applied, from the base station.

13 Claims, 14 Drawing Sheets

(51) Int. Cl.
  *H04L 5/00* (2006.01)
  *H04W 24/08* (2009.01)
  *H04W 72/04* (2009.01)

(58) Field of Classification Search
  USPC .......................................... 370/329
  See application file for complete search history.

(56) References Cited

U.S. PATENT DOCUMENTS

| | | | |
|---|---|---|---|
| 2014/0071838 A1 | 3/2014 | Jia et al. | |
| 2014/0198677 A1* | 7/2014 | Xu | H04L 1/0009 370/252 |
| 2016/0183234 A1* | 6/2016 | Sung | H04W 72/046 370/329 |
| 2016/0262167 A1* | 9/2016 | Lan | H04W 72/085 |
| 2016/0330630 A1* | 11/2016 | Yoo | H04L 5/0048 |
| 2017/0012682 A1 | 1/2017 | Baines | |

FOREIGN PATENT DOCUMENTS

| | | |
|---|---|---|
| CN | 106134120 | 11/2016 |
| EP | 3166245 | 5/2017 |
| EP | 3567783 | 11/2019 |
| WO | WO2016003168 | 1/2016 |

OTHER PUBLICATIONS

CN Office Action in Chinese Appln. No. 201780085614.6, dated Jul. 5, 2021, 10 pages (with English translation).

* cited by examiner

METHOD FOR DETERMINING MODULATION AND CODING SCHEME IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/008062, filed on Jul. 26, 2017, which claims the benefit of U.S. Provisional Application No. 62/454,803, filed on Feb. 5, 2017. The disclosures of the prior applications are incorporated by reference in their entirety.

TECHNICAL FIELD

The present invention relates to a wireless communication system and, more particularly, to a method for determining a modulation and coding scheme (MCS) to be applied to transmitted and received data and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method of determining a modulation and coding scheme (MCS) to be applied to data in a wireless communication system.

Specifically, this specification proposes a method of adjusting (or changing) an uplink MCS to be applied to uplink data based on a change in the channel state.

Furthermore, this specification proposes a method of adjusting a downlink MCS to be applied to downlink data based on a change in the channel state.

Furthermore, this specification proposes a method of feeding back one or more pieces of beam-related information (e.g., beam state information, beam refinement information) using the same scheduling request (SR).

The technical objects of the present invention are not limited to the aforementioned technical objects, and other technical objects, which are not mentioned above, will be apparently appreciated by a person having ordinary skill in the art from the following description.

Technical Solution

This specification proposes a method of determining a modulation and coding scheme (MCS) to be applied to data in a wireless communication system. The method performed by a user equipment includes reporting, to a base station, channel state information including a first measurement value related to a channel state between the user equipment and the base station, receiving, from the base station, at least one downlink reference signal, calculating a second measurement value related to the channel state using the received at least one downlink reference signal, transmitting, to the base station, a specific uplink signal to request a change in a designated MCS for downlink data when the second measurement value is a preset threshold value or less compared to the first measurement value, and receiving, from the base station, the downlink data to which a changed MCS has been applied.

Furthermore, in this specification, if a default value for the change has been previously set, the changed MCS may be an MCS changed from the designated MCS based on the preset default value.

Furthermore, in this specification, if a plurality of change values for the change has been previously set, the changed MCS may be an MCS changed from the designated MCS based on a specific change value corresponding to a difference between the first measurement value and the second measurement value among the plurality of preset change values.

Furthermore, in this specification, the specific uplink signal may include at least one of information indicating the difference between the first measurement value and the second measurement value or information indicating the specific change value.

Furthermore, in this specification, the specific uplink signal may include a specific scheduling request configured for the change. The scheduling request may include indication information indicating whether the change is requested.

Furthermore, in this specification, the scheduling request may further include indication information indicating whether a resource for the feedback of information related to a beam of the user equipment is requested.

Furthermore, in this specification, the scheduling request may be generated based on a specific sequence corresponding to the request for the change.

Furthermore, in this specification, the specific uplink signal may include indication information configured with any one of 1 bit or 2 bits indicating whether the change is requested. The indication information may be transmitted through a physical uplink control channel.

Furthermore, in this specification, the method may further include receiving, from the base station, at least one of indication information indicating whether the change of the designated MCS for the downlink data is permitted or configuration information for a triggering condition related to the request through higher layer signaling.

Furthermore, a user equipment determining a modulation and coding scheme (MCS) to be applied to data in a wireless communication system proposed in this specification includes a transceiver unit configured to transmit and receive radio signals and a processor functionally connected to the transceiver unit. The processor is configured to report, to a base station, channel state information including a first measurement value related to a channel state between the user equipment and the base station, receive, from the base station, at least one downlink reference signal, calculate a second measurement value related to the channel state using the received at least one downlink reference signal, transmit, to the base station, a specific uplink signal to request a change in a designated MCS for downlink data when the second measurement value is a preset threshold value or less compared to the first measurement value, and receive, from the base station, the downlink data to which a changed MCS has been applied.

Furthermore, this specification proposes a method of determining a modulation and coding scheme (MCS) to be applied to data in a wireless communication system. The method performed by a base station includes receiving, from a user equipment, channel state information including a first measurement value related to a change state between the user equipment and the base station, transmitting, to the user equipment, at least one downlink reference signal, receiving, from the user equipment, a specific uplink signal to request a change in a designated MCS for downlink data if a second measurement value related to a channel state calculated by the user equipment using the at least one downlink reference signal is a preset threshold value or less compared to the first measurement value, and transmitting, to the user equipment, the downlink data to which a changed MCS has been applied in response to the specific uplink signal.

Advantageous Effects

According to an embodiment of the present invention, a retransmission problem attributable to a channel change between a base station and a user equipment can be efficiently improved because an MCS (e.g., an uplink MCS, a downlink MCS) to be applied to data is previously changed through channel state measurement in the user equipment.

Furthermore, according to an embodiment of the present invention, the efficient transmission and reception of data can be performed because an MCS level is adaptively determined in accordance with a change in the channel state between a user equipment and a base station.

Advantages which may be obtained in the present invention are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
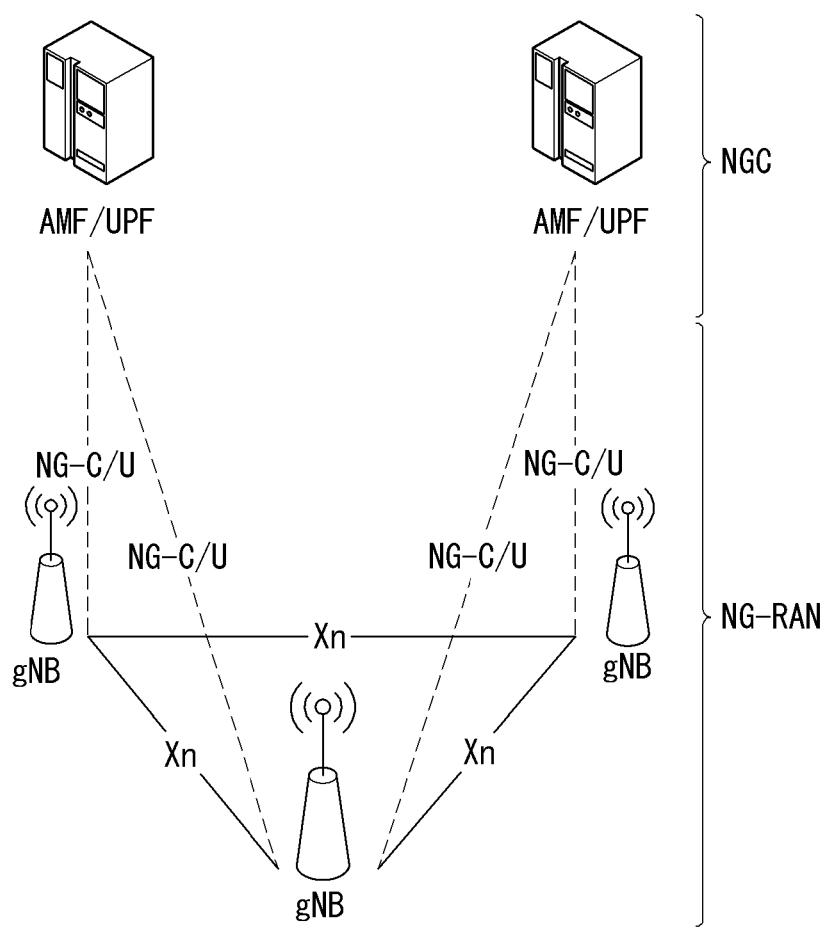
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC.

Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of The radio frame is composed of ten $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
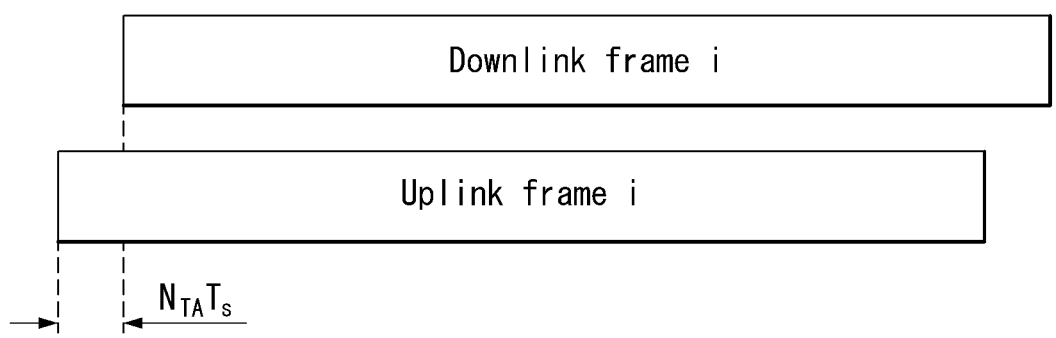
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=T_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots,$ $N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu}N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | Slot configuration | | | | |
|---|---|---|---|---|---|---|
| | | 0 | | | 1 | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
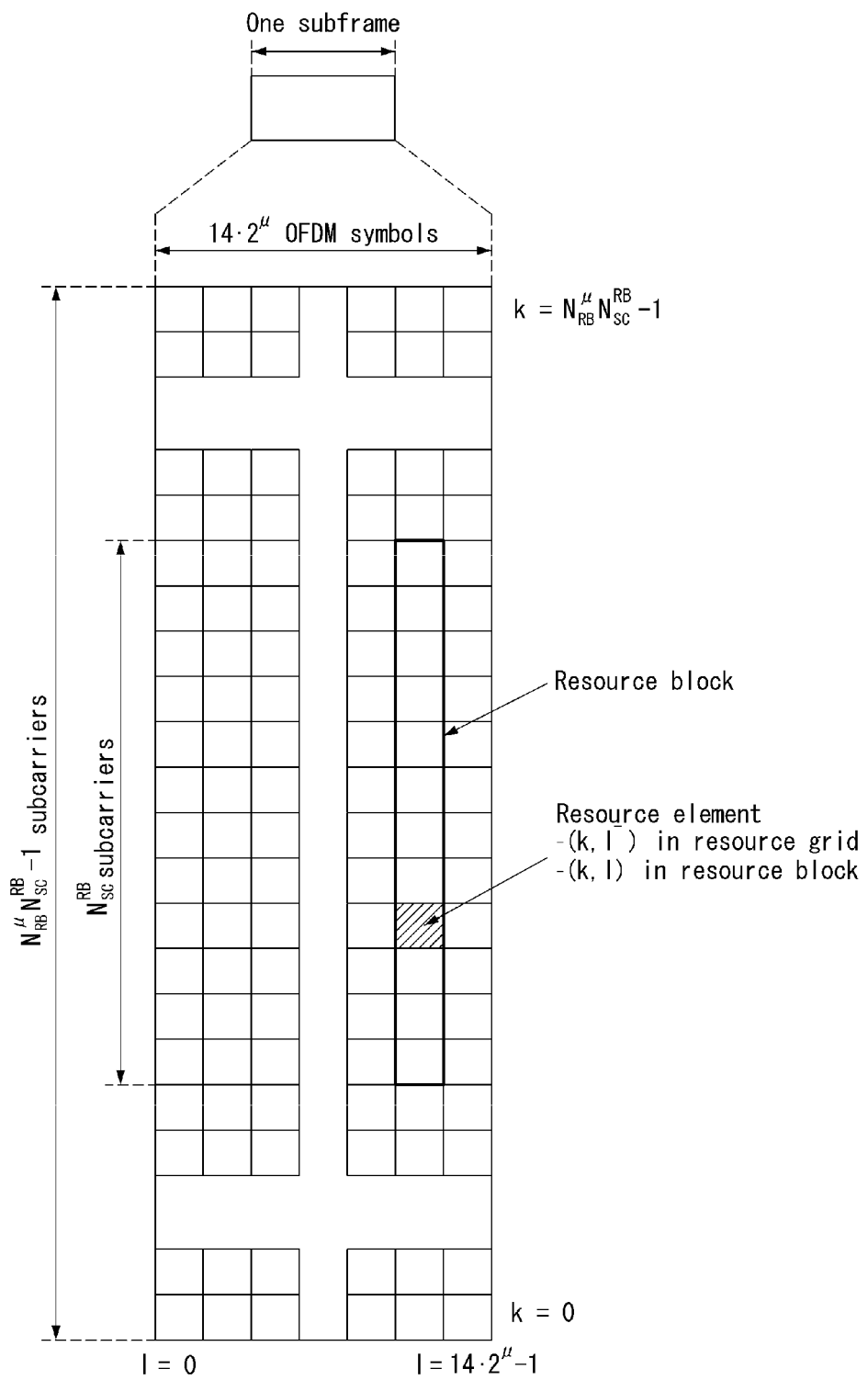
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14.2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
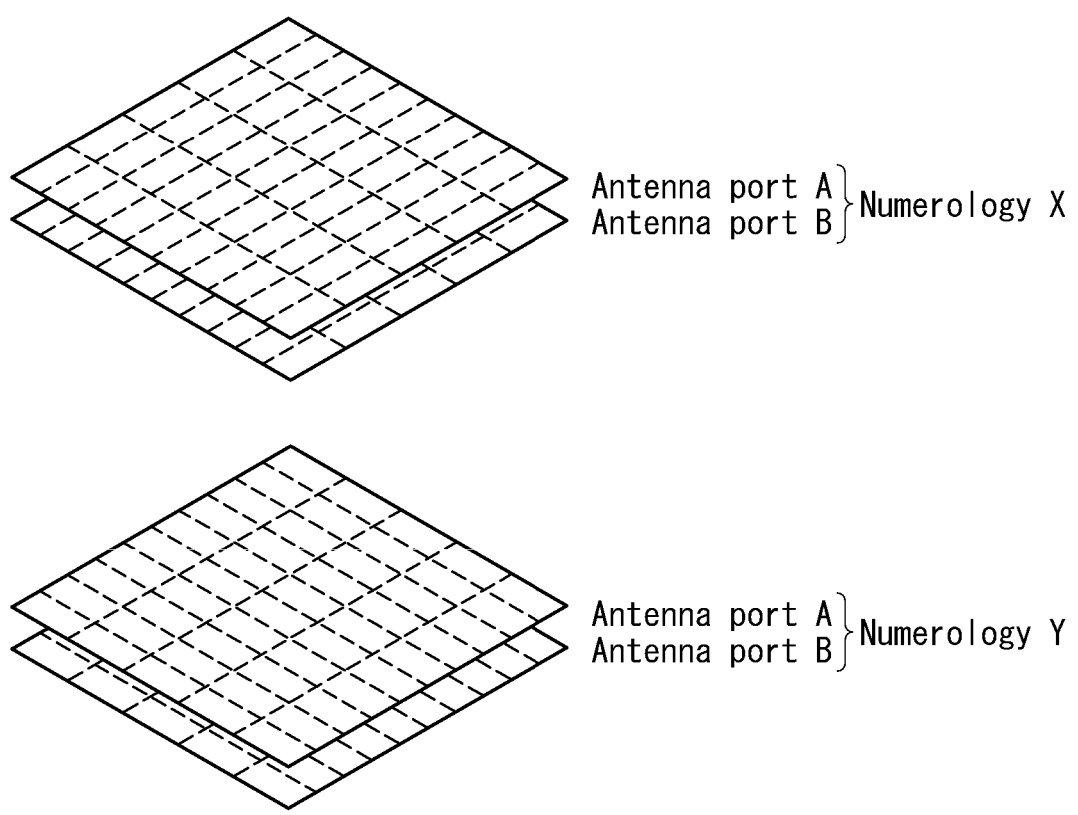
FIG. 4 illustrates examples of resource grids for each antenna port and numerology to which a method proposed in this specification may be applied.

In this case, as illustrated in FIG. 4, one resource grid may be configured for the numerology μ and an antenna port p.

FIG. 4 shows an example of antenna ports and ringer-specific resource grids to which the method proposed herein may be applied.

Each element of the resource grid for the numerology μ and the antenna port p is indicated as a resource element, and may be uniquely identified by an index pair (k,l̄). Herein, $k=0,\ldots,N_{RB}^{\mu}N_{sc}^{RB}-1$ is an index in the frequency domain, and $\bar{l}=0,\ldots,2^{\mu}N_{symb}^{(\mu)}-1$ indicates a location of a symbol in a subframe. To indicate a resource element in a slot, the index pair (k,l) is used. Herein $l=0,\ldots,N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported regardless of whether a reporting configuration is present.

Reporting setting that includes at least:
Information indicating the selected beam
L1 measurement reporting
Time domain operation (e.g., aperiodic operation, periodic operation, semi-persistent operation)
Frequency granularity when multiple frequency granularities are supported
Resource setting that includes at least:
Time domain operation (e.g., aperiodic operation, periodic operation, semi-persistent operation)
RS type: at least NZP CSI-RS
At least one CSI-RS resource set. Each CSI-RS resource set includes K ≥1 CSI-RS resources (Some parameters of K CSI-RS resources may be the same. For example, port number, a time domain operation, density, and periodicity).

Further, NR supports a next beam report considering L group with L>1.

Information indicating minimal groups
Measurement quantity (L1 RSRP and CSI reporting support (when the CSI-RS is for CSI acquisition)) for N1 beam
If applicable, information indicating N1 DL transmission beams The group-based beam reporting as described above may be configured on a UE-by-UE basis. Further, the group-based beam reporting may be turned off on the UE-by-UE basis (e.g., when L=1 or Nl=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hybrid Beamforming

Conventional beamforming techniques using multiple antennas may be divided into an analog beam forming technique and a digital beamforming technique according to position to which beamforming weight vector/precoding vector are applied.

The analog beamforming technique is a beamforming technique applied to a multiple antenna structure in the initial stage. This technique may refer to a technique of branching off an analog signal that has been subjected to digital signal processing to multiple paths and then applying phase shift (PS) and power amplifier (PA) setting to each path to form a beam.

For analog beamforming, a structure in which PA and PS connected to each antenna process an analog signal derived from a single digital signal is required. In other words, the PA and PS process a complex weight in an analog stage.

Figure 5:
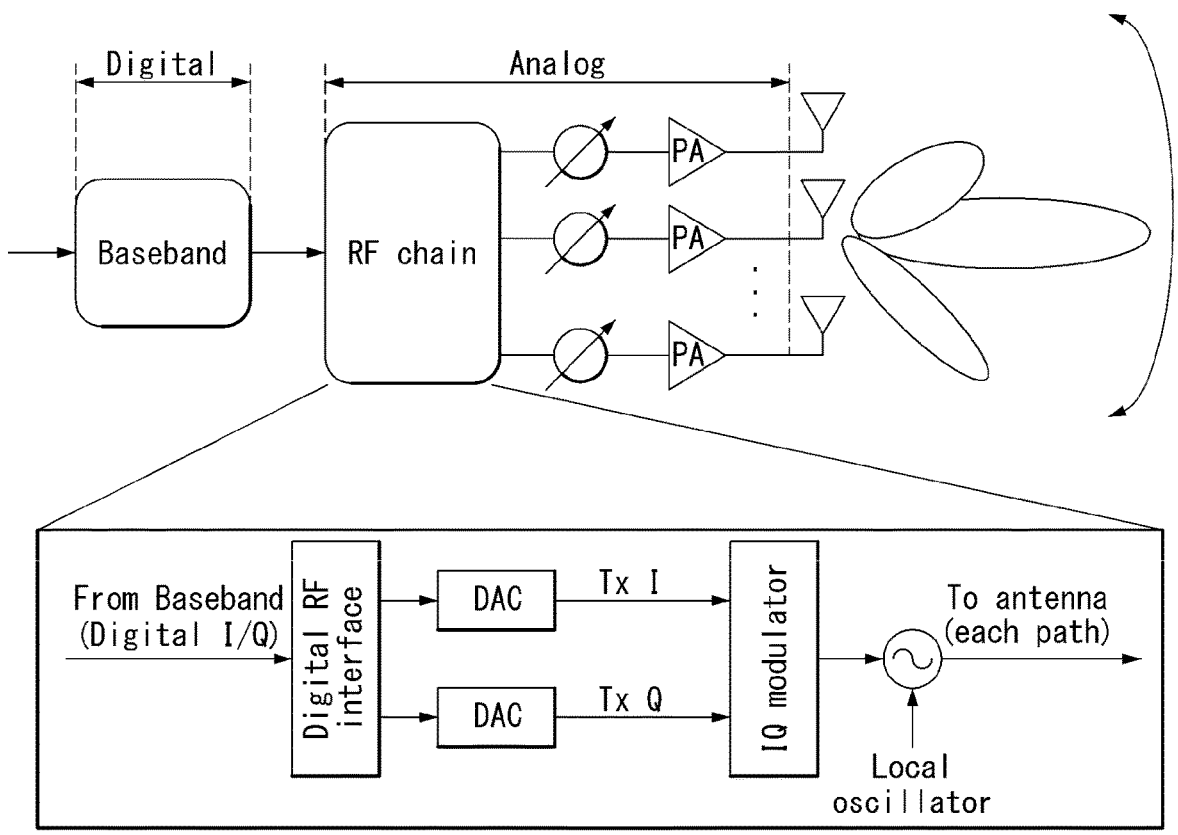
FIG. 5 is an exemplary block diagram of a transmitter composed of an analog beamformer and an RF chain.

FIG. 5 is an exemplary block diagram of a transmitter composed of an analog beamformer and an RF chain. FIG. 5 is for convenience of description and does not limit the scope of the present invention.

In FIG. 5, the RF chain refers to a processing block for converting a baseband (BB) signal into an analog signal. The analog beamforming technique determines beam accuracy according to properties of the PA and PS elements and may be advantageous for narrow band transmission owing to control characteristics of the elements.

In addition, the analog beamforming technique is configured in a hardware structure in which it is difficult to implement multi-stream transmission and thus has relatively low multiplexing gain for transmission rate enhancement. In this case, beamforming per UE based on orthogonal resource allocation may not be easy.

In contrast, in the case of the digital beamforming technique, beamforming is performed in a digital stage using a baseband (BB) process in order to maximize diversity and multiplexing gain in a MIMO environment.

Figure 6:
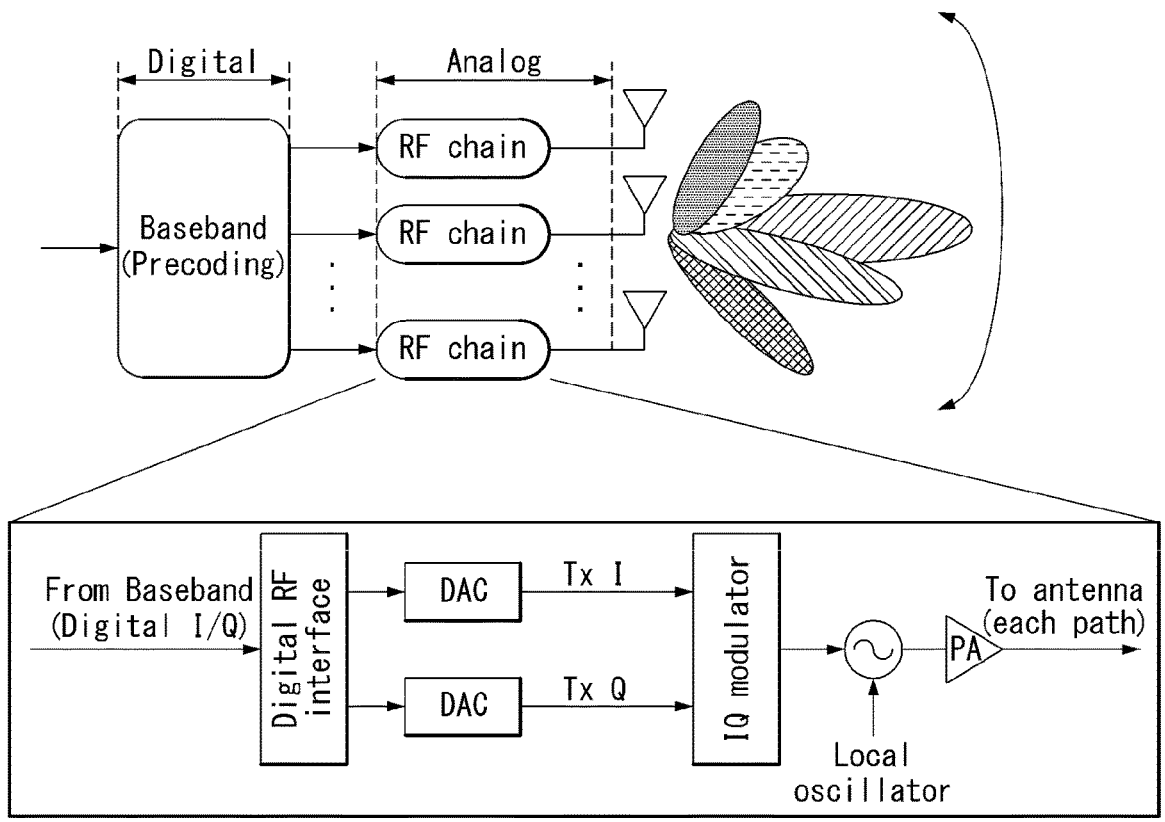
FIG. 6 is an exemplary block diagram of a transmitter composed of a digital beamformer and an RF chain.

FIG. 6 is an exemplary block diagram of a transmitter composed of a digital beamformer and an RF chain. FIG. 5 is for convenience of description and does not limit the scope of the present invention.

In FIG. 6, beamforming may be performed when precoding is performed in a BB process. Here, the RF chain includes a PA because a complex weight derived for beamforming is directly applied to transmitted data in the case of digital beamforming.

In addition, formation of beams for multiple users may be simultaneously supported because beamforming is performed per UE. Furthermore, since independent beamforming may be performed per UE assigned orthogonal resources, scheduling flexibility is improved and thus transmitter operation meeting the purpose of the system may be performed. Moreover, an independent beam may be formed per subcarrier when a technology such as MIMO-OFDM is applied to an environment supporting wideband transmission.

Accordingly, the digital beamforming technique may maximize a maximum transmission rate of a single UE (or user) on the basis of capacity improvement of the system and enhanced beam gain. On the basis of the above-described properties, digital beamforming based MIMO has been introduced to legacy 3G/4G (e.g., LTE(-A)) systems.

In the NR system, a massive MIMO environment in which the number of Tx/Rx antennas remarkably increase may be considered. In general, a maximum number of Tx/Rx antennas applied to a MIMO environment is assumed to be 8 in cellular communication. However, the number of Tx/Rx antennas may increase to tens or hundreds since the massive MIMO environment is considered.

When the aforementioned digital beamforming technique is applied in the massive MIMO environment, a transmitter needs to perform signal processing for hundreds of antennas through a BB process for digital signal processing. This may remarkably increase signal processing complexity and also increase hardware implementation complexity because as many RF chains as the number of antennas are required.

In addition, the transmitter needs to perform independent channel estimation for all antennas. Furthermore, the transmitter requires feedback information about massive MIMO channels configured according to all antennas in the case of an FDD system, and thus pilot and/or feedback overhead may considerably increase.

When the aforementioned analog beamforming technique is applied in the massive MIMO environment, hardware complexity of the transmitter is relatively low.

On the other hand, performance enhancement using multiple antennas is very low and flexibility of resource allocation may decrease. Particularly, it is difficult to control beams per frequency in wideband transmission.

Accordingly, it is necessary to configure a transmitter in a hybrid form by combining the analog beamforming and digital beamforming instead of exclusively selecting only one of analog beamforming and digital beamforming in the massive MIMO environment.

In this case, a hybrid transmitter may be configured using a relationship of performance gain and complexity between analog beamforming and digital beamforming.

Analog Beamforming

In general, analog beamforming may be used in a pure analog beamforming transmitter/receiver and a hybrid beamforming transmitter/receiver. Here, analog beam scanning may perform estimation of one beam at a time. Accordingly, a beam training time necessary for beam scanning is proportional to the number of candidate beams.

As described above, analog beamforming essentially requires a beam scanning process in the time domain for beam estimation in the transmitter/receiver. Here, estimation time Ts for all Tx/Rx beams may be represented as in Equation 2.

$$T_S = t_s \times (K_T \times K_R) \qquad \text{[Equation 2]}$$

In Equation 2, is denotes a time necessary for one beam scanning, KT represents the number of Tx beams and KR represents the number of Rx beams.

Figure 7:
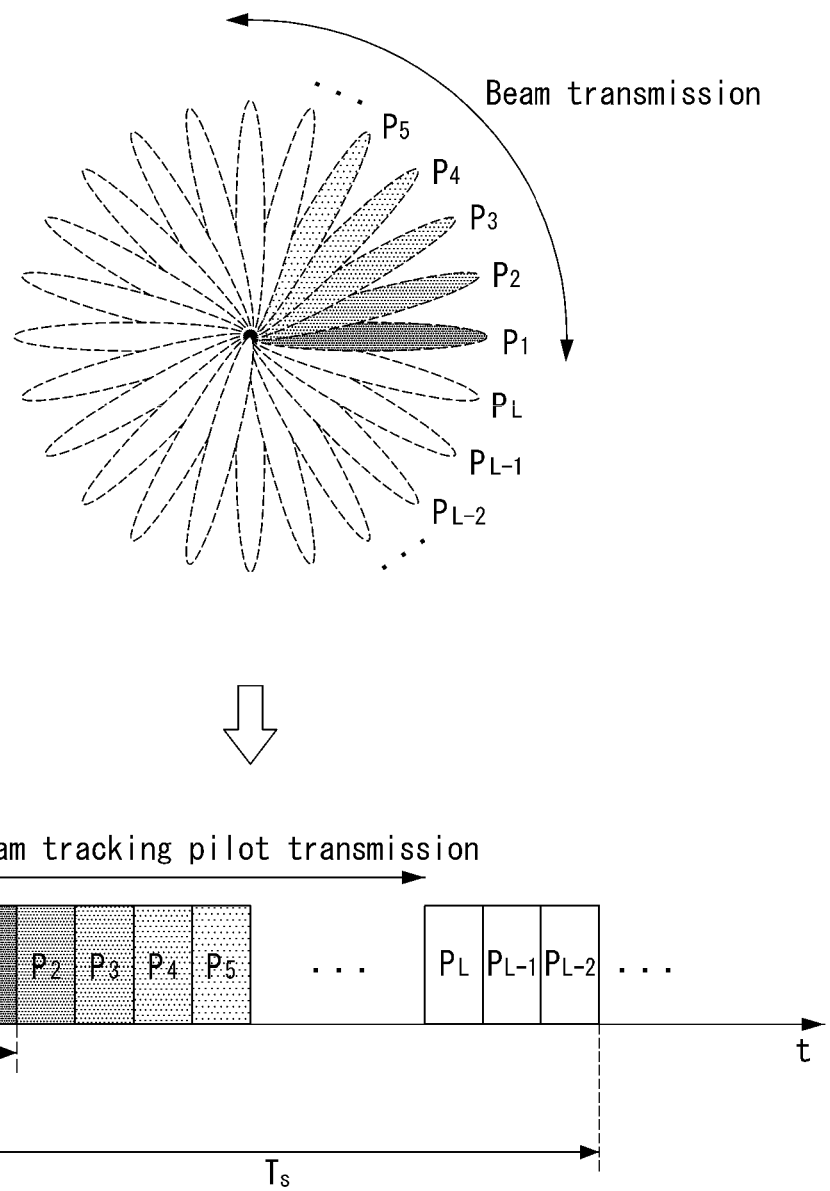
FIG. 7 illustrates an example of analog beam scanning according to various embodiments of the present invention.

FIG. 7 illustrates an example of an analog beam scanning method according to various embodiments of the present invention. FIG. 7 is shown for convenience of description and does not limit the scope of the present invention.

In FIG. 7, it is assumed that the number of Tx beams, KT, is L and the number Rx beam, KR, is 1. In this case, a total number of candidate beams is L and thus L time periods are required in the time domain.

In other words, since estimation of only one beam may be performed in a single time period for analog beam estimation, L time periods are required to estimate L beams P1 to PL, as shown in FIG. 7. A UE feeds back the identifier (ID) of a beam having the highest signal strength to a BS after an analog beam estimation procedure is ended. That is, a longer training time may be required when the number of individual beams increases as the number of Tx/Rx antennas increases.

Analog beamforming changes the magnitude and phase angle of continuous waveforms of the time domain after a Digital-to-Analog Converter (DAC), and thus a training period for an individual beam needs to be secured for analog beamforming, distinguished from digital beamforming. System efficiency may decrease (i.e., system loss increases) as the length of the training period increases.

Channel State Information Feedback

In most cellular systems including the legacy LTE system, a UE receives a pilot signal (e.g., a reference signal (RS)) for channel estimation from a BS, calculates channel state information (CSI) and reports the calculated value to the BS. The BS transmits a data signal (i.e., downlink data) on the basis of the CSI fed back from the UE. In the case of the LTE system, the CSI fed back by the UE includes channel quality information (CQI), a precoding matrix index (PMI) and a rank indicator (RI). Hereinafter, CQI feedback, PMI feedback and RI feedback will be described in detail.

CQI feedback is radio channel quality information provided by a UE to a BS for the purpose of providing information about a modulation and coding scheme (MCS) applied by the BS for data transmission. When radio quality between the BS and the UE is high, the UE feeds back a high CQI value to the BS. Then, the BS transmits data using a relatively high modulation order and low channel coding rate. When radio quality between the BS and the UE is low, the UE feeds back a low CQI value to the BS. In this case, the BS transmits data using a relatively low modulation order and high channel coding rate.

PMI feedback is preferred precoding matrix information provided by the UE to the BS for the purpose of providing information about a MIMO precoding scheme to be applied when the BS configures multiple antennas. The UE estimates a downlink MIMO channel between the BS and the UE from a pilot signal and delivers information about efficient MIMO precoding to be applied by the BS through PMI feedback. In the LTE system, only linear MIMO precoding that may be represented in the form of a matrix is considered in PMI configuration.

In this case, the BS and the UE share a codebook composed of a plurality of precoding matrices, and MIMO precoding matrices in the codebook have unique indices. Accordingly, the UE feeds back the index corresponding to the most preferred MIMO precoding matrix through a PMI to minimize the quantity of feedback information of the UE. Here, a PMI value need not be necessarily configured as one index. For example, when the number of Tx antenna ports is 8, 8 Tx MIMO precoding matrices may be derived by combining two indices (i.e., a first PMI and a second PMI).

RI feedback is information about the number of preferred transport layers provided by the UE to the BS when the UE and the BS may perform multi-layer transmission through spatial multiplexing using multiple antennas. Here, the RI and the PMI are closely related to each other because the BS needs to determine which precoding will be applied to each layer on the basis of the number of transport layers.

In PMI/RI feedback configuration, a method of configuring a PMI codebook on the basis of single layer transmission, defining a PMI per layer and feeding back the PMI by a UE may be considered. However, this method remarkably increases the quantity of PMI/RI feedback information as the number of transport layers increases. Accordingly, a PMI codebook is defined per number of transport layers in the LTE system. That is, N number of Nt×R matrices are defined in a codebook for R-layer transmission. Here, R is the number of layers, Nt is the number of Tx antenna ports, and N is the size of the codebook. Accordingly, the size of a PMI codebook is defined irrespective of the number of transport layers in the LTE system. In this case, the number of transport layers, R, corresponds to the rank value of a precoding matrix (Nt×R matrix).

The PMI/RI described in the present description are not limited to the PMI/RI which refer to the index value and the rank value of a precoding matrix (Nt×R matrix) in the LTE system. Furthermore, the PMI described in the present description refers to information representing a preferred MIMO precoder among MIMO precoders applicable to a transmitter. In this case, the form of a precoder is not limited to a linear precoder that may be represented as a matrix. In addition, the RI described in the present description includes any feedback information representing the number of preferred transport layers and may be interpreted in a broader sense than the RI in LTE.

Such CSI may be generated for all of system frequency regions or generated for some frequency regions. Particularly, a method of generating and feeding back CSI for a preferred frequency region (e.g., subband) per UE may be efficient in a wideband (or broadband) system.

In addition, feedback of CSI is performed through an uplink channel in the LTE system. In general, periodic CSI feedback is performed through a PUCCH (Physical Uplink Control Channel) and aperiodic CSI feedback is performed through a PUSCH (Physical Uplink Shared Channel).

PUCCH CSI reporting modes for periodic CSI feedback performed through a PUCCH may be defined as shown in FIG. 4. Here, the PUCCH CSI reporting modes represent information fed back by a UE when the UE performs periodic CSI feedback.

TABLE 4

| | | PMI Feedback Type | |
|---|---|---|---|
| | | No PMI (OL, single-antenna) | Single PMI (CL) |
| CQI Feedback Type | Wideband | Mode 1-0 RI One wideband CQI(4 bit) When RI > 1, CQI of first codeword | Mode 1-1 RI Wideband CQI(4 bit) Wideband spatial CQI(3 bit) for RI > 1 Wideband PMI(4 bit) |
| | UE selected | Mode 2-0 RI Wideband CQI(4 bit) Best-1 CQI(4 bit) in each BP Best-1 indicator(L-bit label) When RI > 1, CQI of first codeword | Mode 2-1 RI Wideband CQI(4 bit) Wideband spatial CQI(3 bit) for RI > 1 Wideband PMI(4 bit) Best-1 CQI(4 bit) in each BP Best-1 spatial CQI(3 bit) for RI > 1 Best-1 indicator(L- bit label) |

Differently from periodic CSI feedback, aperiodic CSI feedback is temporarily performed only when a BS requests CSI feedback information. In this case, the BS triggers aperiodic CSI feedback through a downlink control channel such as a PDCCH (Physical Downlink Control Channel)/ePDCCH (enhanced PDCCH). When aperiodic CSI feedback is triggered in the LTE system, PUSCH CSI reporting modes representing information that needs to be fed back by a UE may be defined as shown in Table 5. In this case, a PUSCH CSI reporting mode in which the UE will operate may be indicated through higher layer signaling.

TABLE 5

| | | PMI Feedback Type | |
|---|---|---|---|
| | | No PMI (OL, TD, single-antenna) | With PMI (CL) |
| PUSCH CQI feedback type | Wideband (Wideband CQI) | | Mode 1-2: Multiple PMI RI $1^{st}$ wideband CQI(4 bit) $2^{nd}$ wideband CQI(4 bit) if RI > 1 Subband PMIs on each subband |
| | UE Selected (subband CQI) | Mode 2-0 RI (only for Open-loop SM) Wideband CQI(4 bit) + Best-M CQI(2 bit) Best-M index When RI > 1, CQI of first codeword | Mode 2-2: Multiple PMI RI $1^{st}$ wideband CQI(4 bit) + Best-M CQI(2 bit) $2^{nd}$ wideband CQI(4 bit) + Best-M CQI(2 bit) if RI > 1 Wideband PMI/ Best-M PMI Best-M index |
| | Higher layer-configured (subband CQI) | Mode 3-0 RI (only for Open-loop SM) widebandCQI(4 bit) + subbandCQI(2 bit) When RI > 1, CQI of first codeword | Mode 3-1: Single PMI RI $1^{st}$ wideband CQI(4 bit) + subband CQI(2 bit) $2^{nd}$ wideband CQI(4 bit) + subband CQI (2 bit) if RI > 1 Wideband PMI |

In the case of PUCCH, the quantity of data (i.e., a payload size) that may be transmitted at a time is small, and thus it may be difficult to transmit CSI at a time. Accordingly, a CQI and PMI transmission time (e.g., a subframe) and an RI transmission time may be set to be different from each other according to each PUCCH CSI reporting mode. For example, the UE may transmit only the RI at a specific PUCCH transmission time and transmit a wideband CQI at another PUCCH transmission time in Mode 1-0.

In addition, a PUCCH reporting type may be defined according to the type of CSI configured at a specific PUCCH transmission time. For example, a reporting type of transmitting only the RI corresponds to type 3 and a reporting type of transmitting only a wideband CQI corresponds to type 4. A feedback period and an offset value with respect to the RI and a feedback period and an offset value with respect to the CQI/PMI may be indicated (or set) to the UE through higher layer signaling (i.e., higher layer message).

The aforementioned CSI feedback information is included in uplink control information (UCI).

Reference Signal (RS)

Data is transmitted through a radio channel in a wireless communication system and thus signals may be distorted during transmission. To correctly receive a distorted signal at a receiver, distortion of the received signal needs to be corrected using channel information. To detect channel information, a method of transmitting a signal known to both a transmitter and a receiver and a method of detecting channel information using a degree to which a signal is distorted during transmission are used. The aforementioned signal is referred to as a pilot signal or a reference signal.

Most recent mobile communication systems use a method of adopting multiple Tx antennas and multiple Rx antennas to improve transmission/reception data efficiency, instead of a method of using one Tx antenna and one Rx antenna, to transmit packets. When data is transmitted and received using multiple input/output antennas, a channel state between a Tx antenna and an Rx antenna needs to be detected in order to correctly receive signals. Accordingly, each Tx antenna needs to have an individual reference signal.

In the case of the LTE system, the purpose of the pilot signal or RS may be defined as the following four types.

(1) Measurement RS: pilot for channel state measurement
  1) CSI measurement/reporting (short term measurement): link adaptation, rank adaptation, closed loop MIMO precoding, etc.
  2) Long term measurement/reporting: handover, cell selection/reselection, etc.
(2) Demodulation RS: pilot for physical channel reception
(3) Positioning RS: pilot for UE positioning
(4) Multicast-Broadcast Single-Frequency Network Reference Signal (MBSFN RS): pilot for multicast/broadcast services In a mobile communication system, RSs may be divided into an RS for channel information acquisition and an RS for data demodulation. The former needs to be transmitted through a wide band because it is used for a UE to acquire channel information on downlink and to be received and measured by even UEs which do not receive downlink data in a specific subframe. In addition, the former is also used for measurement of handover. The latter is an RS sent by a BS along with corresponding resources when the BS performs downlink transmission, and a UE may perform channel estimation and data demodulation by receiving the RS. This RS needs to be transmitted in a data transmission region.

In this case, to solve an RS overhead problem due to an increase in the number of antennas, a CSI-RS (Channel State Information-RS) may be used as an RS for channel information acquisition and a UE-specific RS may be used as the RS for data demodulation. The CSI-RS is an RS designed for CSI measurement and feedback and has very low RS overhead compared to the CRS (Cell-specific Reference Signal). The CRS supports up to 4 antenna ports, whereas the CSI-RS is designed to support up to 8 antenna ports.

The UE-specific RS is designed for data channel demodulation and is an RS to which a MIMO precoding scheme applied to data transmission to the corresponding UE is equally applied (i.e., precoded RS). Accordingly, as many UE-specific RSs as the number of transport layers (i.e., transmission rank) may be transmitted although as may CRSs and CSI-RSs as the number of antenna ports are transmitted. In addition, the UE-specific RS is transmitted for the purpose of data channel reception of the corresponding UE in the same resource region as the data channel resource region allocated to each UE through a scheduler of a BS and thus is UE-specific.

In the case of LTE uplink, there are a sounding RS (SRS) as a measurement RS, a demodulation RS (DM-RS) with respect to an uplink data channel (PUSCH), and a demodulation RS with respect to an uplink control channel (PUCCH) for ACK/NACK and CSI feedback.

In the case of an NR system, a PTRS (Phase-Tracking Reference Signal) for measuring and tracking phase change may be additionally present.

In the NR system, channel setting and transmission of data and/or control information between a BS and a UE may be performed through a beamforming method. In this case, the BS and the UE determine an optimal (or preferred) beam pair by performing beam tracking and/or beam sweeping. Here, the optimal beam pair refers to a beam pair in which transmission of data and/or control information between the BS and the UE is optimized and consists of a beam of the BS and a beam of the UE.

To determine the optimal beam pair, the BS and the UE measure quality of a link between the BS and the UE using a reference signal (e.g., SRS, CSI-RS, etc.). The BS and the UE determine an optimal beam pair for transmission and reception of data and/or control information on the basis of such measurement and perform transmission and reception of data and/or control information through the determined optimal beam pair.

However, after the BS and the UE determine an optimal beam pair (i.e., an optimal channel) by performing the measurement, a channel state between the BS and the UE may suddenly change due to a factor, such as channel blockage or the rotation of the UE before the BS and the UE actually perform the transmission of data and/or control information. For example, a beam gain may be reduced because the beam (e.g., a transmission (Tx) beam, reception beam (Rx beam)) of the UE is twisted due to the rotation of the UE. That is, as in FIG. 8, a loss of a beam gain may occur because the UE is rotated.

Figure 8:
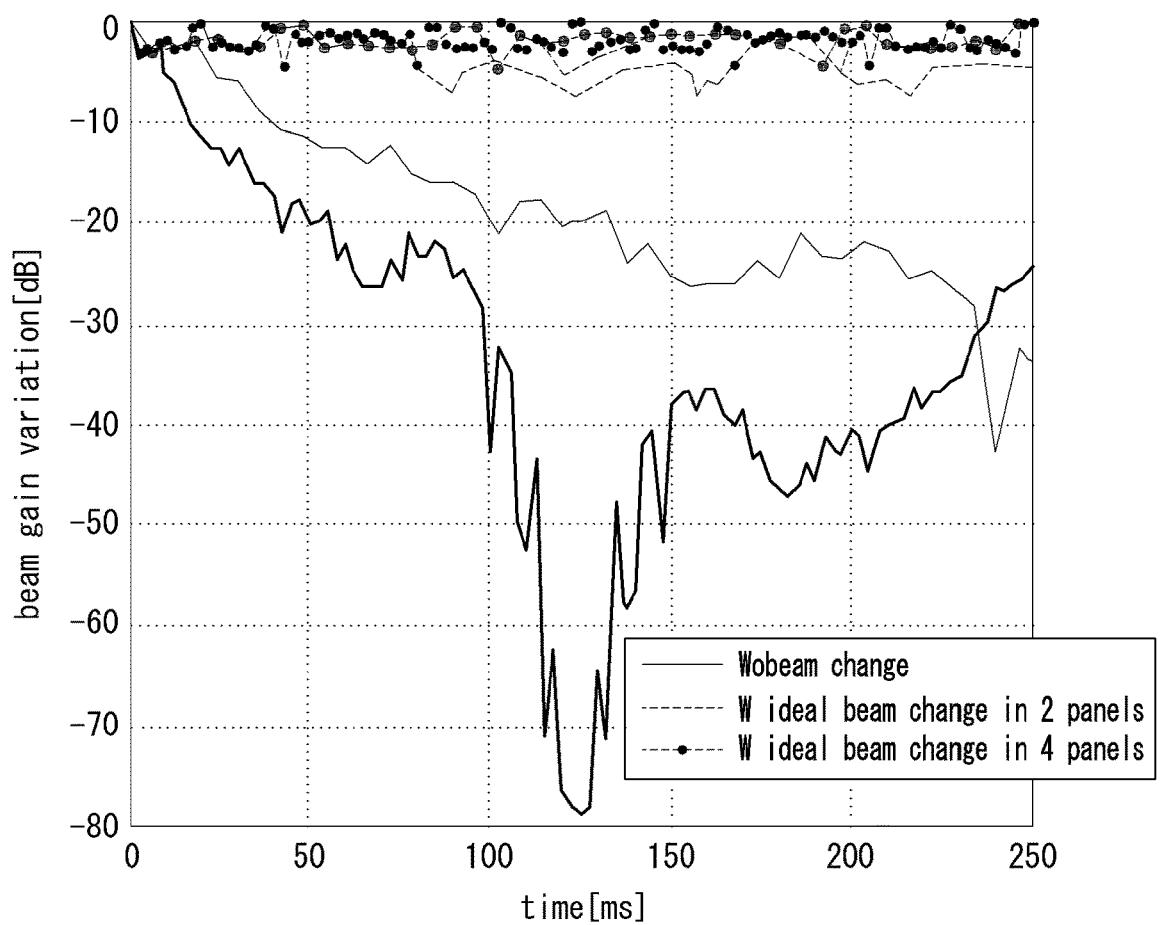
FIG. 8 shows an example of a beam gain variation according to the rotation of a user equipment.

FIG. 8 shows an example of a beam gain variation according to the rotation of a UE. FIG. 8 is merely for convenience of description, and does not limit the scope of the present invention.

Referring to FIG. 8, it is assumed that the UE supports a 4×8 antenna panel and the rotating speed of the UE is 12 RPM (0.72°/msec). Furthermore, a beam gain loss is represented in a decibel (dB) unit.

In this case, if time of 30 msec is supported, that is, if the UE is rotated 21.6°, a maximum beam gain loss of 12.5 dB may occur.

As described above, when a sudden change (or variation) in the channel state occurs, a case where a modulation and coding scheme (MCS) (e.g., an uplink (UL) MCS, a downlink (DL) MCS) designated in the BS is not supported for actual data transmission through the measurement may occur. In this case, the transmission of actual data may include the transmission of DL data in addition to the transmission of UL data.

Accordingly, in order to solve a problem, such as that described above, a method of performing back-off on an MCS designated in a BS needs to be taken into consideration. Hereinafter, in this specification, back-off for an MCS may mean that the existing designated MCS level is lowered. That is, back-off for an MCS may mean the change, modification, reconfiguration or adjustment of a designated MCS. Specifically, back-off for an MCS may mean that an MCS level designated for specific data (UL data or DL data) is changed into a lower MCS level.

Hereinafter, in this specification, a method of backing off (or modifying) an MCS designated for data transmission in accordance with a sudden channel change occurring depending on channel blockage or the rotation of a UE, such as that described above, is specifically described with reference to a related drawing.

First, a method proposed in this specification may be basically divided into a first embodiment and a second embodiment depending on the type of MCS to which back-off is applied. That is, the first embodiment means a method of backing off an MCS (i.e., UL MCS) designated for the transmission of UL data. The second embodiment means a method of backing off an MCS (i.e., DL MCS) designated for the transmission of DL data.

Furthermore, the following embodiments have been divided for convenience of description, and some elements or characteristics of an embodiment may be included in another embodiment or may be substituted with corresponding elements or characteristics of another embodiment. Alternatively, the following embodiments may also be applied, if necessary.

FIRST EMBODIMENT—BACK-OFF FOR UL MCS

First, the first embodiment relates to a method of backing off (or adjusting) an UL MCS designated by a BS with respect to the transmission of UL data in accordance with a channel change.

That is, when a sudden change in the channel state occurs between a BS and a UE, the UE may estimate an MCS offset and transmit UL data according to an MCS (i.e., adjusted MCS) selected by the UE, instead of an UL MCS designated by the BS.

Figure 9:
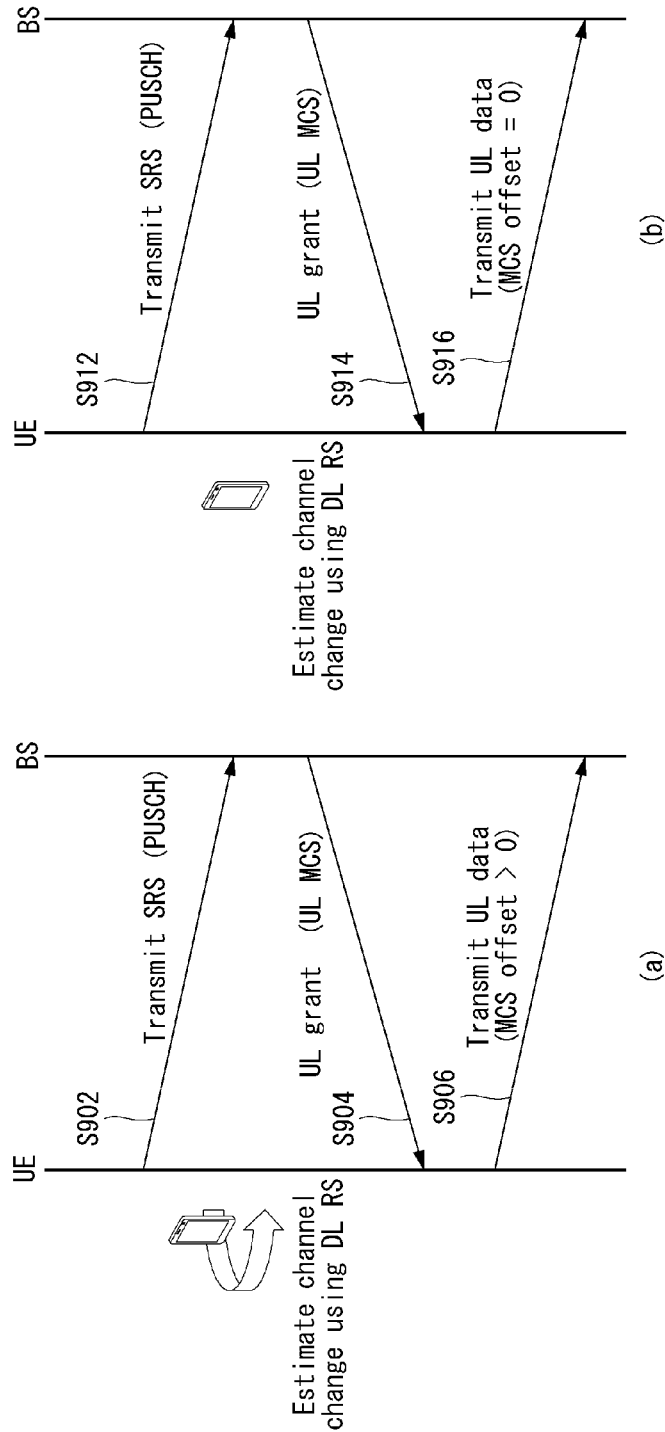
FIG. 9 shows examples in which a user equipment applies an MCS offset for the back-off of an UL MCS to which a method proposed in this specification may be applied.

In this case, the UE may determine (or estimate) the MCS offset using one of two methods shown in FIG. 9.

FIG. 9 shows examples in which a UE applies an MCS offset for the back-off of an UL MCS to which a method proposed in this specification may be applied. FIG. 9 is merely for convenience of description, and does not limit the scope of the present invention.

Referring to FIG. 9, it is assumed that the UE determines whether to change an UL MCS designated by a BS and to transmit UL data using a downlink reference signal (DL RS).

FIG. 9(*a*) shows an operating flowchart of a UE when a channel change is a preset threshold value or more. Specifically, the UE transmits an SRS (through a PUSCH) to a BS (S902), and estimates (or measures) a change in the channel occurring before it receives an UL grant from the BS (S904). That is, the UE measures a channel change between SRS transmission timing and UL grant reception timing. In this case, if the measured channel change is a preset threshold or more, the UE transmits UL data to the BS using an MCS to which an MCS offset greater than 0 (i.e., an MCS offset>0) has been applied (S906). In this case, the UE may transmit information for an MCS offset value to the BS, while transmitting the UL data. The operation shown in FIG. 9(*a*) may be configured as an optional operation in relation to the back-off of the UL MCS.

In contrast, FIG. 9(*b*) shows an operating flowchart of a UE when a channel change is a preset threshold value or more. Specifically, the UE transmits an SRS (through a PUSCH) to a BS (S912), and estimates (or measures) a change in the channel occurring before it receives an UL grant from the BS (S914). In this case, if the measured channel change is a preset threshold value or less, the UE transmits UL data to the BS using an MCS to which an MCS offset of 0 (i.e., an MCS offset=0) has been applied, that is, an MCS designated by the BS (S916). In this case, the UE may transmit information for an MCS offset value to the BS, while transmitting the UL data. The operation shown in FIG. 9(*b*) may be configured as a default operation in relation to the back-off of an UL MCS.

In this case, the MCS offset value may be piggybacked to a PUSCH (i.e., uplink control information (UCI) may be multiplexed with a PUSCH) or may be transmitted through a PUCCH.

Furthermore, in the process shown in FIG. 9, a case where it is difficult for the UE to transmit all data to be transmitted using an MCS, selected by the UE (i.e., an MCS offset has been applied), using a physical resource block (PRB) allocated by a BS may occur. In this case, the UE may transmit a buffer status report (BSR) using an additional scheduling request (SR) along with the UL data. In this case, the BSR means indication indicating that data to be transmitted from the UE to the BS has been left and/or information on the amount of data. In this case, the additional SR including the BSR (or BSR information) may be piggybacked to a PUSCH or may be transmitted through a PUCCH.

Furthermore, in the process shown in FIG. 9, the preset threshold value related to an uplink channel change may be determined through downlink channel change measurement using uplink/downlink channel reciprocity. Accordingly, a UE determines an MCS offset by comparing a downlink measurement value, measured in a subframe in which an SRS is transmitted or a subframe neighboring the subframe, with a downlink measurement value measured in a subframe in which an UL grant is received or a subframe neighboring the subframe. In this case, the MCS offset value may be set as a value corresponding to the amount of channel change or a given value preset (or designated) through higher layer signaling (e.g., radio resource control (RRC) signaling).

Specifically, in order to determine a downlink measurement value, a UE may use a reference signal (RS), such as a beam reference signal (BRS), a beam refinement reference signal (BRRS) or a CSI-RS. For example, if a user reference signal is a non-beamformed reference signal (RS), the UE may measure an estimated value or quality change of a channel. In contrast, if a used reference signal is a beamformed reference signal (RS), the UE may measure whether to change a preferred RS port index in addition to a change in the quality itself for a preferred RS port.

If a downlink reference signal (DL RS) for measuring an uplink channel change is not present in a neighbor subframe of an SRS and/or an UL grant, a UE may configure an MCS offset using the operation (i.e., default operation) shown in FIG. 9(b).

In this case, information for the UL data and MCS offset value transmitted from the UE to the BS may be properly received by the BS. That is, an error of the transmission of a PUSCH (or a PUCCH in the case of the MCS offset value) in which the information for the UL data and the MCS offset value is carried may occur. The PUSCH may be transmitted according to an UL MCS designated by the BS or an UL MCS selected by the UE (i.e., an MCS obtained by subtracting an MCS offset value from an UL MCS designated by the BS).

The error may be divided into two cases depending on the subject of error. Specifically, the error may occur with respect to UL data and an MCS offset value or may occur with respect to UL data only. In such a case, a BS and a UE may perform two different retransmission operations, such as those shown in FIG. 10.

Figure 10:
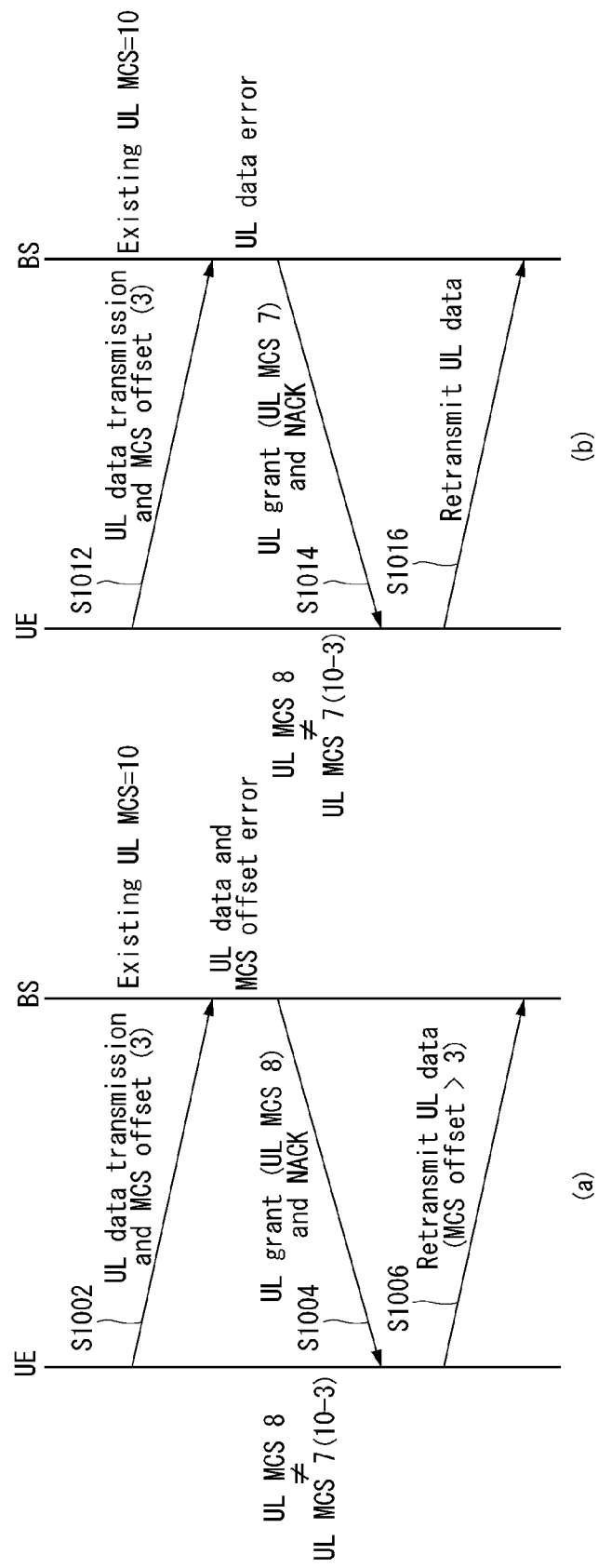
FIG. 10 shows examples of a retransmission procedure between a base station and a user equipment if an error in PUSCH transmission has occurred to which a method proposed in this specification may be applied.

FIG. 10 shows examples of a retransmission procedure between a BS and a UE if an error in PUSCH transmission has occurred to which a method proposed in this specification may be applied. FIG. 10 is merely for convenience of description, and does not limit the scope of the present invention.

Referring to FIG. 10, it is assumed that the UE transmits UL data to the BS using an MCS designated by the BS or an MCS selected by the UE. In this case, the UE may transmit the UL data and an MCS offset value (i.e., a value used to adjust or back off the MCS designated by the BS).

(a) of FIG. 10 shows a retransmission procedure performed by a UE and a BS if an error has occurred in both an MCS offset value transmitted by the UE and the UL data of a PUSCH. In this case, the BS transmits an UL grant to the UE as a pre-designated given MCS value not NACK information for the UL data and an MCS value designated by the BS. In this case, the pre-designated given MCS value means an MCS value preset for a retransmission UL grant.

Specifically, if an error has occurred in an UL data transmitted by the UE and information on an MCS offset (i.e., an MCS offset=3) (S1002), the BS transmits, to the UE, an UL grant (i.e., UL grant for retransmission) configured as a pre-designated given MCS value (i.e., UL MCS=8) and NACK, not an UL MCS value (i.e., UL MCS=10) that has been previously designated and forwarded (S1004). In this case, the UE may determine a reception error of the MCS offset value of the BS by comparing an MCS value (i.e., UL MCS=7 (10-3)), selected by the UE, and the retransmission UL MCS (i.e., UL MCS=8) indicated by the BS. Furthermore, the UE may determine a reception error in the UL data of the BS using the NACK information. Accordingly, if the UE determines that an error has occurred in both the MCS offset value and the UL data, the UE may set the MCS value as a value higher than the pre-designated given value (i.e., an MCS offset>3), and retransmits the UL data to the BS according to a lower MCS (S1006).

In contrast, (b) of FIG. 10 shows a retransmission procedure performed by a UE and a BS if an error has occurred only in the UL data of a PUSCH transmitted by the UE. Specifically, in this case, the BS transmits, to the UE, an UL grant as NACK information for UL data and an MCS value selected by the UE. In this case, the BS may neglect a BSR included in an additional SR, may calculate (or estimate) the UL data of a BSR included in the existing SR, and may allocate an UL resource.

Specifically, if an error has occurred in only UL data among the UL data transmitted by a UE and information for an MCS offset (i.e., an MCS offset=3) (S1012), a BS transmits, to a UE, an UL grant (i.e., UL grant for retransmission), configured as an MCS value selected by the UE (i.e., UL MCS=7 (10-3)), and NACK, not a pre-designated UL MCS value (i.e., UL MCS=10) (S1014). In this case, the UE may determine a reception error of the MCS offset value of the BS by comparing an MCS value (i.e., UL MCS=7 (10-3)), selected by the UE, and a retransmission UL MCS (i.e., UL MCS=7) indicated by the BS. Furthermore, the UE may determine a reception error of the UL data of the BS using the NACK information. Accordingly, if the UE has determined that an error has occurred in the UL data only, the UE retransmits the UL data to the BS using the selected MCS (i.e., UL MCS=7) (S1016).

If both the MCS offset value and the UL data of a PUSCH are normally received by the BS, the BS may calculate (or estimate) the UL data of a BSR included in an additional SR, and may allocate an UL resource. In this case, the BS may transmit information for the corresponding UL resource allocation to the UE along with ACK information. The UE that has received the information for the corresponding UL resource allocation information and the ACK information transmits the remaining UL data to the BS.

SECOND EMBODIMENT—BACK-OFF FOR DL MCS

As described above, a UE measures a channel state based on a CSI-RS (i.e., a CSI-RS for channel measurement) transmitted by a BS, and feeds CQI for the measured channel state back to the BS. Thereafter, the BS determines a DL MCS using the CQI received from the UE, and transmits DL data to the UE using the determined DL MCS. In this case, channel blockage or the rotation of a UE may occur between CSI-RS transmission timing and DL data transmission timing due to the mobility of the UE. Accordingly, a channel state between a BS and the UE may suddenly change (or vary). In this case, a determined DL MCS may not be supported for DL data transmission due to a change in the channel state.

The second embodiment relates to a method of backing off (or adjusting) a DL MCS, designated by a BS with respect to the transmission of DL data, in accordance with such a change in the channel state. Specifically, in the second embodiment, when a link quality level measured by a UE using a DL RS is lower than a link quality level (by a given level or less) that is measured through a CSI-RS and reported, there is proposed a procedure of requesting DL MCS back-off through an uplink signal or channel (e.g., through an SR or a dedicated random access channel (RACH), a PUCCH). In this case, the link quality level may include the meaning of a value related to a channel quality level, a channel quality value or a channel state.

Figure 11:
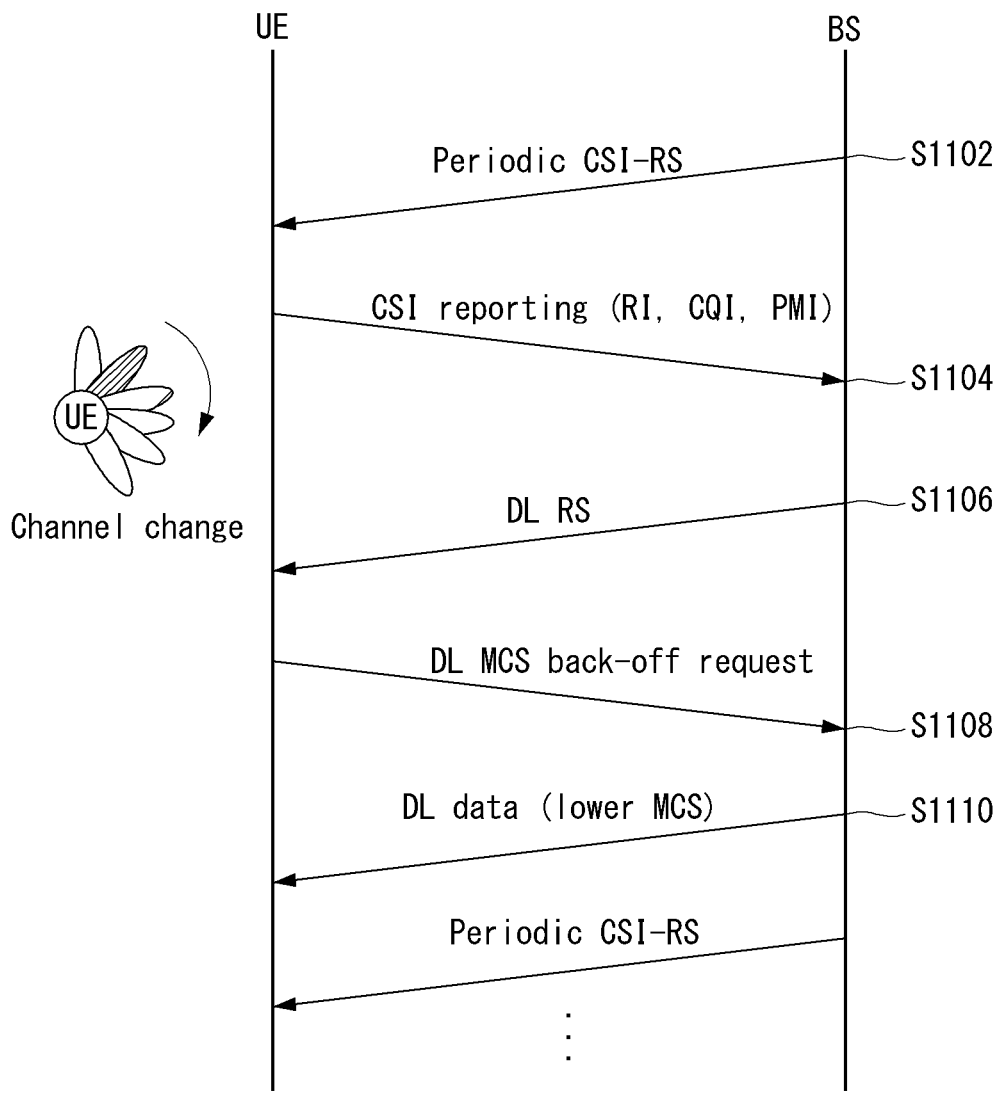
FIG. 11 shows an example of a procedure of requesting, by a user equipment, the back-off of a DL MCS from a base station to which a method proposed in this specification may be applied.

FIG. 11 shows an example of a procedure of requesting, by a UE, the back-off of a DL MCS from a BS to which a method proposed in this specification may be applied. FIG. 11 is merely for convenience of description, and does not limit the scope of the present invention.

Referring to FIG. 11, it is assumed that a change occurs in the channel state between a UE and a BS before the UE receive a DL RS, after the UE and the BS configure a channel using a beamforming scheme and the UE reports channel state information (CSI) to the BS. In this case, in the case of FIG. 11, it is assumed that the UE receives a periodic CSI-RS from the BS for channel measurement (or channel estimation). However, subsequent procedures described in FIG. 11 may also be applied to a case where CSI reporting for an aperiodic CSI-RS has been performed.

Hereinafter, procedures of requesting, by the UE, the back-off of a DL MCS (i.e., a change (or adjustment) for a DL MCS) from the BS, which are shown in FIG. 11, are described specifically.

First, the UE receives a periodic CSI-RS from the BS (step S1102), and measures a channel quality value (or a link quality level) between the BS and the UE using the received CSI-RS. Thereafter, the UE reports channel state information (CSI) (e.g., RI, CQI, PMI) for the measured channel quality value to the BS (step S1104).

Thereafter, the UE receives a DL RS from the BS. In this case, the DL RS may include a mobility RS, a DM-RS or a CSI-RS. In this case, the CSI-RS included in the DL RS may be different from a CSI-RS which is used to report a link quality level, that is, the subject of comparison. For example, the CSI-RS included in the DL-RS may mean a reference signal transmitted for beam management (e.g., beam refinement. The CSI-RS used to report a link quality level may mean a reference signal transmitted for channel estimation (or measurement).

The UE may measure link quality (i.e., channel quality) between the UE and the BS using the received DL RS. In this case, the link quality measured by the UE may mean CQI for channel state information reporting or may mean received power (e.g., a signal to noise ratio (SNR), a signal to interference plus noise ratio (SINR)) for the received DL RS.

If the measured link quality is lower than a value, reported in S1104, by a given level or less, the UE requests the back-off of a DL MCS (step S1108). In this case, the given level may be previously set as one or more values based on a quality reduction level (i.e., a channel change value) for link quality. In this case, configuration information for the given level may be previously defined or may be indicated through higher layer signaling and/or downlink control information (DCI).

Furthermore, in this case, the back-off value of the DL MCS may be set as a default value based on link quality or may be set as a plurality of values based on a degree of back-off (i.e., a level of quality reduction). The BS may transmit DL data to the UE using a DL MCS backed off as a default value or a specific value indicated among the plurality of values (step S1110).

For example, if the DL MCS back-off value is set as one default value, the BS may reduce an MCS (or DL MCS) to a default value in accordance with the feedback of (DL) MCS back-off, and may transmit DL data (i.e., DL data configured according to a low MCS) to the UE (step S1110). That is, the BS may reduce a pre-designated MCS to a preset MCS offset value in accordance with MCS (or DL MCS) back-off requested by the UE, and may transmit DL data to the UE. In this case, the MCS back-off may have a single state or signal.

For another example, if the DL MCS back-off value is set as a plurality of values based on a level of a link quality reduction, the BS may reduce a pre-designated MCS to a pre-designated MCS value based on a value indicated by the UE (or a value of a link quality reduction), and may transmit DL data to the UE. For example, if 4 MCS offset values are designated, the BS may transmit DL data using an MCS having an MCS offset set to 2, 4, 6, or 8 low. In this case, a specific MCS value to be used for DL data transmission may be indicated by the UE. Alternatively, if the UE reports a change value of a link quality level to the BS, the BS may select a specific MCS value according to a preset rule for an MCS offset.

Furthermore, an UL signal for requesting, by a UE, MCS back-off from a BS may be configured as a scheduling request (SR), a (dedicated) RACH, or a 1-bit/2-bit CQI PUCCH (e.g., PUCCH allocated/configured as MCS back-off dedicated). In this case, the transmission period of the SR/RACH for requesting MCS back-off may be different from that of the existing SR for an UL grant/RACH for random access. In this case, a transmission period and/or configuration information (or condition) for the SR/RACH for requesting MCS back-off may be indicated (or configured) (by the BS) through higher layer signaling.

In relation to the SR, the existing (e.g., legacy LTE) SR was transmitted in the on-off state of energy using the PUCCH format 1 for the scheduling request of UL data. In contrast, an SR for requesting MCS back-off, proposed in this specification, may be forwarded (or transmitted) in an information bit form (i.e., bitmap form). For example, if the SR is allocated as 2 bits, "00" may indicate an SR request, "01" may indicate a beam-related UCI multiplexing request toward an xPUSCH for beam state information feedback, "10" may indicate an RS request for beam refinement, and "11" may indicate an MCS (or DL MCS) back-off request. As described above, if an MCS offset value is set as a plurality of values based on a reduction level of link quality, the information bit of the SR may be set as bits of 2 bits or more. Accordingly, each of the plurality of values may be indicated.

Alternatively, the SR may be transmitted in a signal form not an information bit form. For example, if the signal is configured using a Zadoff-Chu sequence, a UE may request an MCS offset from a BS using a different root index and/or cyclic shift. For another example, if the signal is configured using a pseudo-random sequence, a UE may request an MCS offset from a BS using a different scrambling seed and/or orthogonal cover code (OCC).

In this case, a transmission method using the information bit and/or signal form may be applied to an RACH and/or PUCCH for requesting MCS back-off n addition to an SR for requesting MCS back-off.

The BS that has received the request for the back-off of the DL MCS through an UL signal (e.g., SR, dedicated RACH, PUCCH) from the UE may reduce the DL MCS to a designated MCS offset value and transmit DL data to the UE. Accordingly, a retransmission (e.g., HARQ retransmission) problem attributable to a link quality reduction, that is, a quality reduction attributable to a channel change between the UE and the BS, can be solved. Accordingly, the efficient transmission of DL data can be performed.

However, the MCS back-off request of a UE, such as that described above, may cause unnecessary UL interference, unnecessary UL resource consumption and/or power consumption of the UE because it operates according to an event-trigger method. In order to solve the problems, a BS may previously indicate (configure) an MCS back-off request operation (e.g., on/off) and/or a trigger condition for an MCS back-off operation through higher layer signaling (e.g., signaling using a MAC-CE, RRC signaling). In this case, the trigger condition may include a received quality level of a DL RS (e.g., the DL RS at step S1106 of FIG. 11).

Furthermore, a BS may indirectly indicate an MCS back-off request operation and/or a trigger condition for an MCS back-off operation, instead of direction indication of the BS, such as the signaling. For example, if only a periodic CSI-RS has been allocated within a specific time period and/or CSI feedback timing is a specific slot number or more, a channel aging problem attributable to the rotation of a UE may be caused. Accordingly, such cases may be pre-configured or may be indicated as an MCS back-off request operation and/or a trigger condition for an MCS back-off operation. For example, if only a periodic CSI-RS has been allocated within a specific time period, a UE may indirectly determine that an MCS back-off operation is possible, and may request an MCS back-off from a BE through a comparison between the received qualities of DL RSs.

In another embodiment, a UE may request (e.g., configure the xPUSCH UCI feedback request field (feedback request field) of an UL grant as a value greater than 0) beam-related UCI multiplexing toward an xPUSCH (i.e., PUSCH supported in an NR system) using the same (dedicated) SR, or may request a beam refinement RS (BRRS). In this case, the BS may notify the UE of whether the beam-related UCI multiplexing toward an xPUSCH is permitted through an UL grant or may allocate a BRRS resource to the UE through BRRS-related DCI as a response to the SR. Thereafter, the UE may multiplex UCI over the xPUSCH or perform beam refinement based on the allocated BRRS resource in response to the response to the SR.

In this case, as the two different operations are defined as the same SR resource, ambiguity may occur in the BS aspect. In this case, the BS may process the ambiguity in a scheduling aspect. That is, the BS and the UE may select one of two procedures shown in FIG. 12 as a response to the SR, and may perform the selected procedure.

Figure 12:
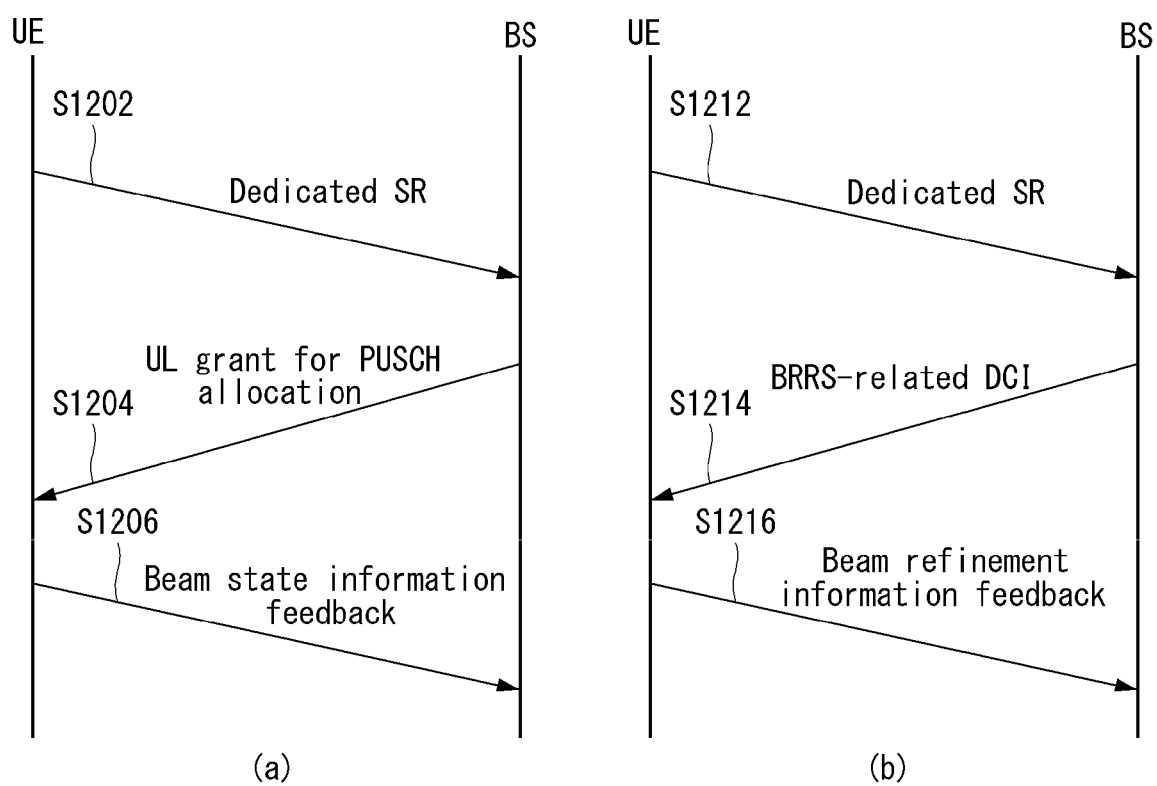
FIG. 12 shows examples of procedures of feeding back beam-related information based on the same scheduling request (SR) to which a method proposed in this specification may be applied.

FIG. 12 shows examples of procedures of feeding back beam-related information based on the same scheduling request (SR) to which a method proposed in this specification may be applied. FIG. 12 is merely for convenience of description, and does not limit the scope of the present invention.

Referring to FIG. 12, it is assumed that a UE uses the same (dedicated) SR in order to request a resource in which beam-related information is to be fed back. In this case, the beam-related information may include beam state information or beam refinement information.

(a) of FIG. 12 shows an operation when a BS configures an UL grant based on a dedicated SR. Specifically, if the BS recognizes that a dedicated SR (step S1202) received from the UE is a request for beam state information feedback, the BS transmits, to the UE, an UL grant in which an xPUSCH UCI feedback request field is configured as a value greater than 0 (step S1204). In this case, the xPUSCH UCI feedback request field may be configured with n bits. If the xPUSCH UCI feedback request field is configured with 2 bits, "00" may indicate disabled, "01" may indicate 1-beam information transmission, "10" may indicate 2-beam information transmission, and "11" may indicate 4-beam information transmission. Thereafter, the UE that has received the UL grant may multiplex beam state information over the xPUSCH and forward (or feedback) it to the BS.

In contrast, (b) of FIG. 12 shows an operation when a BS allocates a BRRS resource based on a dedicated SR. Specifically, if the BS recognizes that a dedicated SR (step S1212) received from a UE is a request for a BRRS, the BS may allocate a BRRS resource to the UE through BRRS-related DCI (step S1214). Thereafter, the UE may perform beam refinement through the BRRS-related DCI, and may forward (or feedback) beam refinement information to the BS (step S1216).

As described above, a UE may request a resource in which beam-related information (e.g., beam state information (BSI), beam refinement information (BRI)) will be fed back using a dedicated SR. In this case, a BS may allocate, to the UE, a resource to be used for the feedback of the corresponding beam-related information using DL DCI (i.e., DL grant) and/or UL DCI (i.e., UL grant). In this case, the BS may process the request of the UE using the following three methods.

First, as the first method, the BS may allocate a PUCCH resource to the UE using DL DCI with respect to the request of the UE. In this case, the UE may feed beam-related information back using the allocated PUCCH resource.

As the second method, the BS may allocate a PUSCH resource to the UE using UL DCI (i.e., UL grant) with respect to the request of the UE. In this case, the UE may perform feedback by multiplexing (i.e., piggybacking) beam-related information over the allocated PUSCH resource.

As the third method, if a dedicated SR is defined as an RACH preamble, the BS may allocate a feedback resource to the UE using an RACH response. In this case, the UE may feed beam-related information back using a resource allocated (or defined) through the RACH response.

Meanwhile, a BS may notify (or indicate) a UE of a feedback resource (e.g., PUSCH, PUCCH) through a MAC-CE regardless of the type of dedicated SR or the scheduling of a BS. In this case, the UE may transmit the feedback of beam-related information (e.g., the feedback of beam-related information for beam recovery) to the BS through a MAC-CE.

Figure 13:
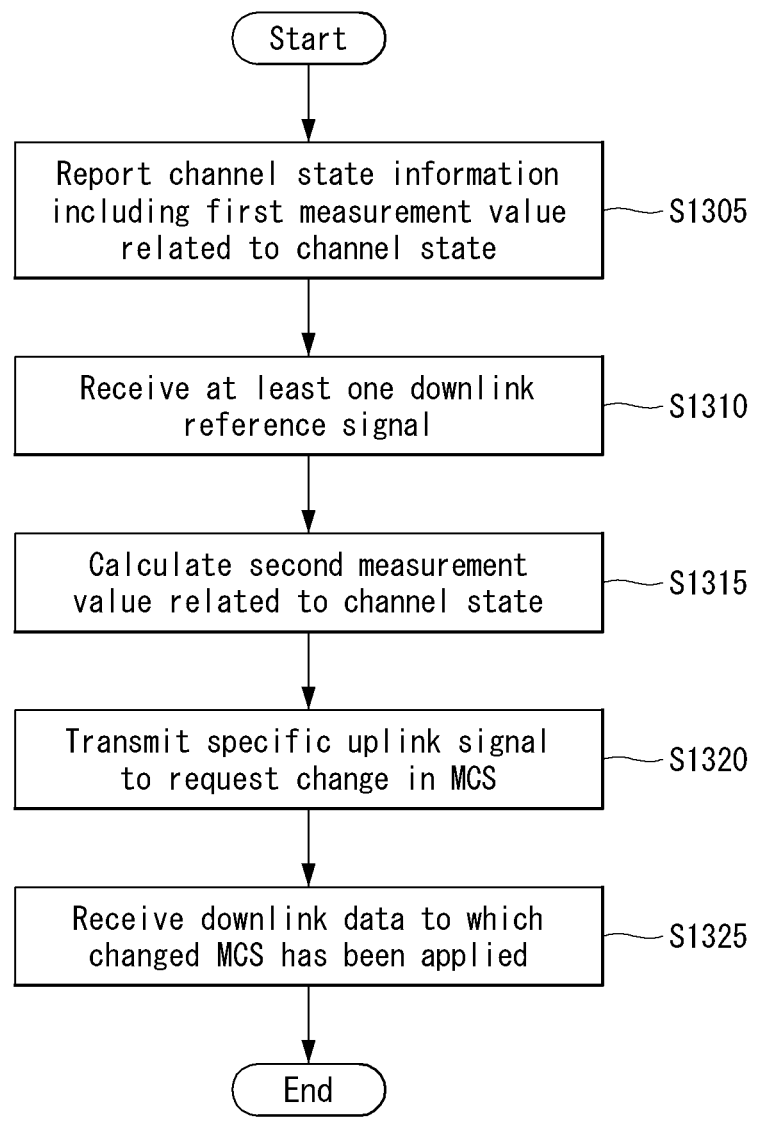
FIG. 13 shows an operating flowchart of a user equipment that determines a modulation and coding scheme(MCS) to be applied to data to which a method proposed in this specification may be applied.

FIG. 13 shows an operating flowchart of a UE that determines a modulation and coding scheme (MCS) to be applied to data to which a method proposed in this specification may be applied. FIG. 13 is merely for convenience of description, and does not limit the scope of the present invention.

A method of requesting, by a UE, that a preset MCS level should be changed into a low MCS level from a BS with respect to downlink data due to a channel change (e.g., the above-described channel blockage or a channel change caused by the rotation of the UE) is descried with reference to FIG. 13. In this case, an operation of the UE in FIG. 13 may be similar to or identical with the operation of the UE described in FIG. 11.

First, at step S1305, the UE reports, to a BS, channel state information including a first measurement value related to a channel state between the UE and the BS. In this case, the first measurement value may be calculated using a CSI-RS (e.g., a periodic CSI-RS or an aperiodic CSI-RS) received from the BS. Furthermore, the channel state information may include an RI, a PMI and/or CQI.

Thereafter, at step S1310, the UE receives at least one downlink reference signal from the BS. In this case, the at least one downlink reference signal may include the DL RS described in FIG. 11.

At step S1315, the UE calculates a second measurement value related to the channel state between the UE and the BS using the received at least one downlink reference signal. In this case, the second measurement value may include CQI for channel state information (CSI) reporting or received power (e.g., SNR, SINR) for the at least one downlink reference signal.

In this case, if the calculated second measurement value is a preset threshold value (i.e., a given level) or less compared to the first measurement value, at step S1320, the UE transmits, to the BS, a specific uplink signal that requests a change in a designated MCS for downlink data.

In this case, if the specific uplink signal includes a specific (or dedicated) scheduling request (SR) configured for a change in the MCS, the SR may include indication information (e.g., indication information of an information bit or bitmap form) indicating whether the change is requested. Furthermore, the scheduling request may further include indication information indicating whether a resource for the feedback of information (e.g., beam-related information) related to the beam of the UE is requested. Furthermore, as described above, the scheduling request may be generated based on a specific sequence (e.g., Zadoff-Chu sequence or a pseudo-random sequence) corresponding to the request for the change (i.e., request the change).

However, the specific uplink signal may be configured as indication information transmitted through a PUCCH. In this case, the indication information may be configured with any one of 1 bit or 2 bits indicating whether the change is requested.

Thereafter, at step S1325, the UE receives, from the BS, downlink data to which the changed MCS has been applied in accordance with the specific uplink signal. In this case, if a default value for the change (e.g., a default value for the above-described MCS offset) has been previously set, the changed MCS may mean that the designated MCS is an MCS changed based on the preset default value.

In contrast, if a plurality of change values (e.g., MCS offset values) for the change has been previously set, the changed MCS may mean that the designated MCS is an MCS changed based on a specific change value corresponding to a difference between the first measurement value and the second measurement value, among the plurality of preset change values. In this case, in order to indicate the specific change value for the BS, at least one of information (i.e., a reduction level of link quality or a change in the channel state) indicating a difference between the first measurement value and the second measurement value or information indicating the specific change value may be included in a specific uplink signal transmitted from the UE to the BS.

Furthermore, in relation to a request for a change in the MCS, the UE may receive, from the BS, at least one of indication information indicating whether the change is permitted or configuration information for a triggering condition related to the request through higher layer signaling.

General Apparatus to Which the Present Invention is Applicable

Figure 14:
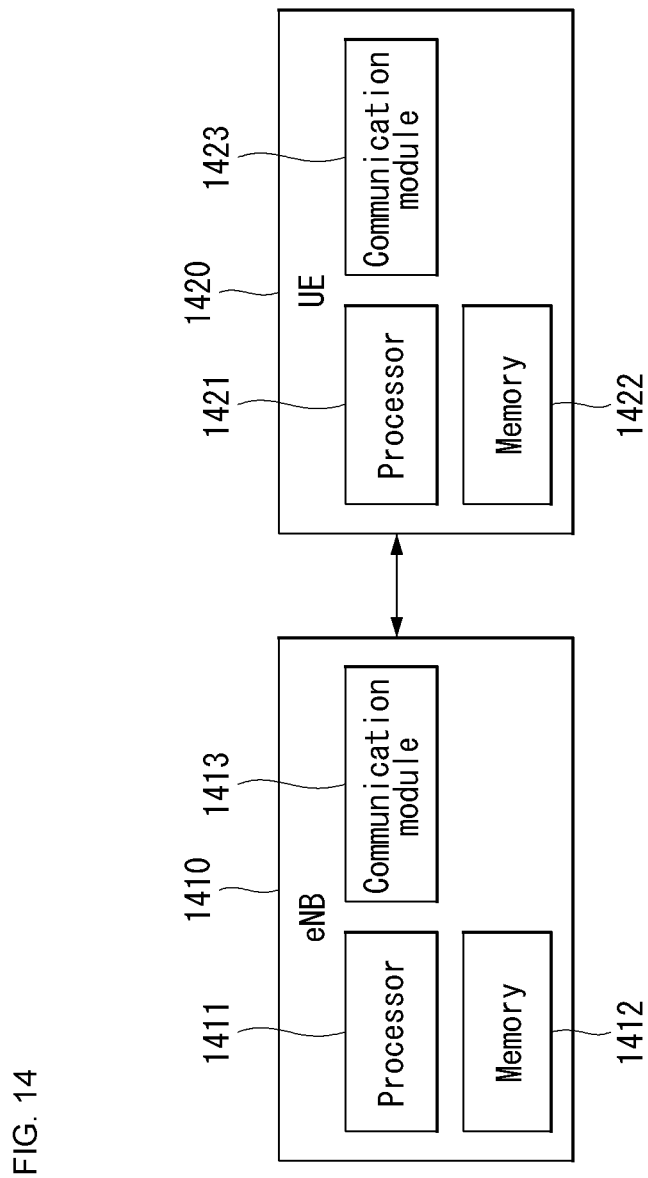
FIG. 14 illustrates a block diagram of a wireless communication device to which methods proposed in this specification may be applied.

FIG. 14 illustrates a block diagram of a wireless communication device to which methods proposed in this specification may be applied.

Referring to FIG. 14, a wireless communication system includes an eNB 1410 and a plurality of UEs 1420 disposed within the area of the eNB 1410.

The eNB 1410 includes a processor 1411, a memory 1412 and a radio frequency (RF) unit 1413. The processor 1411 implements the function, process and/or method proposed in FIGS. 1 to 13. The layers of a radio interface protocol may be implemented by the processor 1411. The memory 1412 is connected to the processor 1411, and stores various pieces of information for driving the processor 1411. The RF unit 1413 is connected to the processor 1411, and transmits and/or receives radio signals.

The UE 1420 includes a processor 1421, a memory 1422 and an RF unit 1423.

The processor 1421 implements the function, process and/or method proposed in FIGS. 1 to 13. The layers of a radio interface protocol may be implemented by the processor 1421. The memory 1422 is connected to the processor 1421, and stores various pieces of information for driving the processor 1421. The RF unit 1423 is connected to the processor 1421, and transmits and/or receives radio signals.

The memory 1412, 1422 may be positioned inside or outside the processor 1411, 1421, and may be connected to the processor 1411, 1421 by various well-known means. Furthermore, the eNB 1410 and/or the UE 1420 may have a single antenna or multiple antennas.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

The scheme of determining a modulation and coding scheme to be applied to data in the wireless communication system of the present invention has been illustrated as being applied to an 3GPP LTE/LTE-A system and a 5G system (New RAT system), but may be applied to various wireless communication systems in addition to the 3GPP LTE/LTE-A system and the 5G system.

The invention claimed is:

1. A method performed by a user equipment operating in a wireless communication system, the method comprising:
    reporting, to a base station, channel state information comprising a first measurement value related to a channel state between the user equipment and the base station;
    receiving, from the base station, at least one downlink reference signal;
    calculating a second measurement value related to the channel state using the received at least one downlink reference signal;
    transmitting, to the base station, a first scheduling request to request a change in a designated modulation and coding scheme (MCS) for downlink data based on the second measurement value being a preset threshold value or less compared to the first measurement value; and
    receiving, from the base station, the downlink data to which a changed MCS has been applied,
    wherein the first scheduling request is differentiated from a second scheduling request which is transmitted in an on-off state of energy for scheduling request of uplink data, and
    wherein the first scheduling request is used for at least one of (i) a beam-related uplink control information multiplexing request to feedback beam state information in an uplink data channel, (ii) a reference signal request for beam refinement, or (iii) a request for change in the designated MCS for the downlink data.

2. The method of claim 1,
    wherein the changed MCS is an MCS changed from the designated MCS based on a preset default value.

3. The method of claim 1,
    wherein the changed MCS is an MCS changed from the designated MCS based on a specific change value corresponding to a difference between the first measurement value and the second measurement value, among a plurality of preset change values.

4. The method of claim 3,
    wherein the first scheduling request comprises at least one of (i) information indicating the difference between the first measurement value and the second measurement value or (ii) information indicating the specific change value.

5. The method of claim 1,
    wherein the first scheduling request is generated based on a specific sequence corresponding to a request for which the first scheduling request is used.

6. The method of claim 1,
    wherein the first scheduling request comprises indication information configured with any one of 1 bit or 2 bits indicating for which request the first scheduling request is used.

7. The method of claim 1, further comprising:
    receiving, from the base station, at least one of indication information indicating whether the change of the designated MCS for the downlink data is permitted or configuration information for a triggering condition related to the request through higher layer signaling.

8. A user equipment configured to operate in a wireless communication system, the user equipment comprising:
    a transceiver unit configured to transmit and receive radio signals, and
    a processor functionally connected to the transceiver unit,
    wherein the processor is configured to:
    report, to a base station, channel state information comprising a first measurement value related to a channel state between the user equipment and the base station;
    receive, from the base station, at least one downlink reference signal;
    calculate a second measurement value related to the channel state using the received at least one downlink reference signal;
    transmit, to the base station, a first scheduling request to request a change in a designated modulation and coding scheme (MCS) for downlink data based on the second measurement value being a preset threshold value or less compared to the first measurement value; and
    receive, from the base station, the downlink data to which a changed MCS has been applied,
    wherein the first scheduling request is differentiated from a second scheduling request which is transmitted in an on-off state of energy for scheduling request of uplink data, and
    wherein the first scheduling request is used for at least one of (i) a beam-related uplink control information multiplexing request to feedback beam state information in an uplink data channel, (ii) a reference signal request for beam refinement, or (iii) a request for change in the designated MCS for the downlink data.

9. The user equipment of claim 8,
    wherein the changed MCS is an MCS changed from the designated MCS based on a preset default value.

10. The user equipment of claim 8,
    wherein the changed MCS is an MCS changed from the designated MCS based on a specific change value corresponding to a difference between the first measurement value and the second measurement value, among a plurality of preset change values.

11. A method performed by a base station operating in a wireless communication system, the method comprising:
- receiving, from a user equipment, channel state information comprising a first measurement value related to a change state between the user equipment and the base station;
- transmitting, to the user equipment, at least one downlink reference signal;
- receiving, from the user equipment, a first scheduling request to request a change in a designated modulation and coding scheme (MCS) for downlink data based on a second measurement value being a preset threshold value or less compared to the first measurement value, wherein the second measurement value is related to a channel state calculated by the user equipment using the at least one downlink reference signal; and
- transmitting, to the user equipment, the downlink data to which a changed MCS has been applied, in response to the first scheduling request,
- wherein the first scheduling request is differentiated from a second scheduling request which is transmitted in an on-off state of energy for scheduling request of uplink data, and
- wherein the first scheduling request is used for at least one of (i) a beam-related uplink control information multiplexing request to feedback beam state information in an uplink data channel, (ii) a reference signal request for beam refinement, or (iii) a request to change in the designated MCS for the downlink data.

12. The method of claim 11,
wherein the changed MCS is an MCS changed from the designated MCS based on a preset default value.

13. The method of claim 11,
wherein the changed MCS is an MCS changed from the designated MCS based on a specific change value corresponding to a difference between the first measurement value and the second measurement value, among a plurality of preset change values.

* * * * *